United States Patent Office

2,730,533
Patented Jan. 10, 1956

2,730,533

TREATMENT OF POROUS NICKEL CATALYSTS WITH AMINES TO PREVENT NUCLEAR HYDROGENATION IN REDUCTION OF QUINONES

Robert R. Umhoefer, Kenmore, N. Y., assignor, by mesne assignments, to Food Machinery and Chemical Corporation, San Jose, Calif., a corporation of Delaware No Drawing. Application March 26, 1952,
Serial No. 278,739

7 Claims. (Cl. 260—369)

This invention pertains to the production of hydrogenation catalysts and more particularly to the production of a selectively acting nickel hydrogenation catalyst suitable for use in the production of hydroquinones from quinones.

If quinones, such as naphthoquinones, anthraquinones, phenanthraquinones and other quinones, are hydrogenated, using a Raney nickel catalyst, the corresponding hydroquinones will form very easily, but the reaction is apt to proceed farther, leading to nuclear hydrogenation with the formation of tetrahydro-hydroquinones. Thus, when hydrogenating 2-ethylanthraquinone in the presence of Raney nickel, the reaction will not stop with the formation of the desired 2-ethylanthrahydroquinone, but will proceed to tetrahydro-2-ethylanthrahydroquinone.

It is an object of this invention to provide means to prevent nuclear hydrogenation when catalytically hydrogenating quinones.

It is a further object of this invention to produce a treated nickel catalyst that is inactive for hydrogenation of the nucleus but active toward the hydrogenation of quinones to hydroquinones.

I have found now that by treating the nickel catalyst with an amine, the ability of the catalyst to hydrogenate the nucleus is greatly reduced or even completely inhibited, without impairment of its ability to hydrogenate the quinones to the corresponding hydroquinones.

In accordance with my invention, the nickel catalyst, prior to its use in the hydrogenation reaction, is treated with an amine or the reaction may be carried out in presence of an amine. However, the nitrogen compounds which, under the conditions prevailing during the use of the catalyst are transformed wholly or in part to amines, are also effective in the method of my invention.

Although amines, generally, can be used in the method of my invention, as may be expected, variations in efficiency are encountered between different types of amines and, as a general rule, aliphatic amines will be more highly efficient than aromatic amines. I, therefore, prefer to use aliphatic amines or amine precursors yielding aliphatic amines under hydrogenation conditions.

The following examples will serve to further illustrate the principle of my invention.

EXAMPLE 1

A Raney nickel catalyst was used to cause hydrogenation of 0.8 g. of 2-ethylanthraquinone dissolved in 20 ml. of a solvent mixture consisting of equal parts of ethylbenzene and tributyl phosphate. The quinone was shaken in this mixture with the Raney nickel catalyst at 30° C. under a hydrogen pressure of 750 mm. Hydrogen was absorbed at a rate corresponding to 62 ml./minute/gram of catalyst during the formation of 2-ethylanthrahydroquinone. After all the quinone had reacted in this manner, hydrogen absorption continued at a rate corresponding to 0.59 ml./minute/gram of catalyst with the formation of the corresponding amount of tetrahydro-2-ethylanthrahydroquinone, this second hydrogenation step corresponding to nuclear hydrogenation.

EXAMPLE 2

To show the effect of amine treatment on the selectivity of the porous nickel catalyst, another sample of the same Raney nickel catalyst, as used in Example 1, was treated with an equal volume of isopropyl alcohol in which was dissolved 2% of piperidine calculated on the weight of the catalyst. The catalyst was mixed with the piperidine solution and left standing for 24 hours at room temperature. The required amount of catalyst was then withdrawn from the mixture and used in the same manner as described in Example 1, to hydrogenate 0.8 g. of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

EXAMPLE 3

Another sample of the same Raney nickel catalyst, as used in Example 1, was treated with an equal volume of 95% ethyl alcohol containing 10% triethylamine calculated on the weight of the catalyst. The catalyst was left standing in the solution for 24 hours at room temperature. It was then washed six times with 95% ethyl alcohol, whereupon the calculated quantity of amine present was less than 1 part per million parts of catalyst. The required volume of catalyst was then withdrawn and used in the same manner as described in Example 1 to hydrogenate 0.8 g. of 2-ethylanthraquinone. Hydrogen was absorbed at a rate corresponding to 60 ml./minute/gram of catalyst during the formation of 2-ethylanthrahydroquinone. Thereafter, no further absorption of hydrogen took place, indicating that nuclear hydrogenation was completely prevented.

The following example illustrates the use of an amine precursor, nitromethane, which, under the conditions prevailing during hydrogenation, yields methylamine. In this instance, the catalyst treating material was added to the solution containing the quinone and protected it against nuclear hydrogenation.

EXAMPLE 4

Another sample of Raney nickel catalyst was used to hydrogenate in the manner described in Example 1, a quinone solution which contained 10.8% of nitromethane calculated on the weight of the catalyst. After the quantity of hydrogen necessary for formation of hydroquinone and methylamine was absorbed, no further uptake in hydrogen occurred. This indicates that an amine formed from precursors during the hydrogenation reaction inhibits nuclear hydrogenation.

EXAMPLE 5

Another sample of the same Raney nickel catalyst, as used in the preceding examples, was treated with nitromethane. However, before using the treated catalyst, it was washed six times with isopropyl alcohol with a resulting reduction of its nitromethane content to less than 1 part per million parts of the catalyst. Then only was the thus treated catalyst used to hydrogenate 0.8 g. of 2-ethylanthraquinone in the same manner as described in Example 1. Hydrogen was absorbed at a rate corresponding to 58 ml./minute/gram of catalyst during formation of 2-ethylanthrahydroquinone. Thereafter hydrogen absorption continued at the rate of 0.18 ml./minute/gram of catalyst. This compared to a hydrogen absorption of 0.58 ml./minute/gram of catalyst for the untreated catalyst in Example 1.

EXAMPLE 6

Another sample of Raney nickel catalyst was treated with an equal volume of isopropyl alcohol in which was dissolved 2% of orthophenylenediamine calculated on the weight of the catalyst. After standing in this treating solution for 24 hours, the activity of the catalyst was tested as described in Example 1. After the formation of 2-ethylanthrahydroquinone, no further absorption of hydrogen occurred, indicating that nuclear hydrogenation was completely prevented by the catalyst treatment.

EXAMPLE 7

Another sample of Raney nickel catalyst was treated with an equal volume of isopropyl alcohol in which was dissolved 2% of morpholine calculated on the weight of the catalyst. After standing in this treating solution for 24 hours, the activity of the catalyst was tested as described in Example 1. After the formation of 2-ethylanthrahydroquinone, no further absorption of hydrogen occurred, indicating that nuclear hydrogenation was completely prevented by the catalyst treatment.

A number of further experiments were then carried out in exactly the same manner as described in Example 2, i. e., treatment of the porous catalyst prior to use. Their results are compiled in the following table, wherein it will be noted that the quinone was protected against nuclear hydrogenation.

Table

| Amine used to treat nickel catalyst | Nuclear hydrogenation prevention |
|---|---|
| Ethanolamine | Complete. |
| Dibutylamine | Do. |
| Ethylenediamine | Do. |
| Hexamethylenetetramine | Do. |
| Pyridine | Do. |
| o-Phenylene diamine | Do. |
| Morpholine | Do. |
| Phenazine | Do. |
| Hydrazine | Do. |
| Phenylhydrazine | Do. |
| Triethanolamine | Do. |
| Orthonitroaniline | Do. |
| Antipyrine | Do. |
| Isoquinoline | Do. |
| Aniline | Substantially Complete. |

In all these experiments, hydroquinone formation was not impaired as substantially stoichiometric amounts of hydrogen necessary for hydroquinone formation from the quinone were absorbed.

What is claimed is:

1. In the process of hydrogenating a quinone dissolved in a liquid organic solvent to a hydroquinone in the presence of a nickel catalyst, the method of preventing nuclear hydrogenation of the quinone but permitting reduction of the quinone to the corresponding hydroquinone which comprises adding an amine to the catalyst and then performing the hydrogenation with the catalyst and in the presence of the amine to reduce the quinone to hydroquinone without nuclear hydrogenation.

2. In the process of hydrogenating a quinone dissolved in a liquid organic solvent to a hydroquinone in the presence of a nickel catalyst, the method of preventing nuclear hydrogenation of the quinone but permitting reduction of the quinone to the corresponding hydroquinone which comprises adding an amine to the catalyst in an amount at least on the order of one part of amine per million parts of catalyst and performing the hydrogenation with the catalyst in the presence of the amine to reduce the quinone to hydroquinone without nuclear hydrogenation.

3. Process of claim 1 in which the amine is piperidine.

4. Process of claim 1 in which the amine is triethylamine.

5. Process of claim 1 in which the amine is pyridine.

6. Process of claim 1 in which the amine is morpholine.

7. Process of claim 1 in which the amine is orthophenylenediamine.

References Cited in the file of this patent

UNITED STATES PATENTS 2,495,521    Hannion et al. _____ Jan. 24, 1950

OTHER REFERENCES

Anisimov et al.: Chem. Abstracts, vol. 32, col. 5773 (1938), 1 page.